United States Patent [19]

Takeshita et al.

[11] Patent Number: 4,539,056

[45] Date of Patent: Sep. 3, 1985

[54] RELEASE SHEET AND A METHOD FOR MAKING THEREOF

[75] Inventors: Kazuhisa Takeshita, Yokohama; Yasuo Takeda, Tokyo, both of Japan

[73] Assignees: Ajinomoto Co., Inc.; Nippon Printing Co., Ltd., both of Japan

[21] Appl. No.: 559,312

[22] Filed: Dec. 8, 1983

[30] Foreign Application Priority Data

Dec. 13, 1982 [JP] Japan ................... 57-216895

[51] Int. Cl.$^3$ .................. B31F 1/12; B05D 5/00; D06N 7/04
[52] U.S. Cl. ................... 156/183; 156/196; 156/209; 156/221; 427/257; 428/151; 428/195; 428/211; 428/220; 428/446; 428/500; 428/904
[58] Field of Search ............ 428/195, 202, 204, 446, 428/500, 904, 151, 211, 220; 264/219; 427/262, 257, 274, 356; 156/61, 183, 209, 221

[56] References Cited

U.S. PATENT DOCUMENTS

| | | | |
|---|---|---|---|
| 2,046,000 | 6/1936 | Sart | 428/151 |
| 3,654,044 | 4/1972 | Hirota | 428/151 |
| 4,021,591 | 5/1977 | DeVries et al. | 428/202 |
| 4,053,669 | 10/1977 | Kapasi et al. | 428/195 |

FOREIGN PATENT DOCUMENTS 1411613  10/1975  United Kingdom ............... 427/148

*Primary Examiner*—Joseph L. Schofer
*Assistant Examiner*—Fred Teskin
*Attorney, Agent, or Firm*—Jacobs & Jacobs

[57] ABSTRACT

This invention relates to a release sheet which comprises a backing sheet, a release resin layer and a pattern layer, the pattern layer being positioned directly or indirectly on the reverse side of the release resin layer in relation to a peeling surface thereof. The release sheet is useful especially as a release sheet used in making synthetic leather.

17 Claims, 4 Drawing Figures

RELEASE SHEET AND A METHOD FOR MAKING THEREOF

BACKGROUND OF THE INVENTION

1. Field of the Invention

This invention relates to a release sheet and more particularly, a release sheet which is used in making synthetic leather, and a method for making the release sheet.

2. Description of the Prior Art

Synthetic leather has usually been manufactured by using what is called "a release sheet". The release sheet comprises a backing sheet and a release resin layer. On the surface of the release resin layer or a peeling surface thereof, there is often embossed an uneven pattern which is complementary to wrinkles and pores of the skin and the like inherent in natural leather. The surface of the release resin layer or the peeling surface is coated with synthetic leather material such as polyurethane resin and then, backing cloth is laminated on the synthetic leather material coating, after which the release sheet is peeled to give synthetic leather. The synthetic leather thus formed comprises the backing cloth and the synthetic leather material. On the surface of the synthetic leather, an irregular pattern similar to the surface pattern inherent in natural leather is formed.

Before being fabricated, natural leather is usually dyed. It is unevenly dyed to form an irregularly dyed pattern or what is called "a cloudy pattern". It is, therefore desired to give the cloudy pattern to the surface of synthetic leather so that the appearance of natural leather is given on synthetic leather thus formed. Several techniques are known in the art to provide synthetic leather with the cloudy pattern.

Generally, no cloudy pattern is formed by simply dyeing synthetic leather. Thus, a printing method is known wherein a gravure coater provided with an engraved roll is used to print the cloudy pattern on the synthetic leather surface. This method has a disadvantage that the irregular pattern corresponding to wrinkles and pores formed on the synthetic leather surface is covered by the printing ink. Another method is also known wherein a knife coater provided with a back-up roll having an engraved cloudy pattern is used to form the pattern on the synthetic leather surface. But, this method has also the same disadvantage as the gravure coater method, neither of the two methods is economical because numbers of rolls are necessary for the cloudy pattern required. Furthermore, the two methods have poor reproducibility and need a certain extent of skill to perform them.

SUMMARY OF THE INVENTION

An object of the present invention is to provide a release sheet which can be mass-produced and can be used to form various patterns on a substrate such as, but not limited to, synthetic leather without the above-mentioned disadvantages of the prior art.

Another object of the present invention is to provide a method for making the release sheet described above.

A release sheet of the present invention comprises a backing sheet, a release resin layer and a pattern layer, said pattern layer being positioned directly or indirectly on the reverse side of the release resin layer in relation to a peeling surface thereof. The release sheet of the present invention is useful especially as a release sheet used in making synthetic leather.

DETAILED DESCRIPTION OF THE INVENTION

A release sheet and a method for making the sheet of the present invention will now be described with reference to the accompanying drawings.

Figure 1:
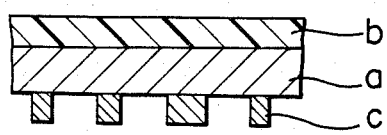
FIG. 1 is a cross-sectional viem of a release sheet according to the first embodiment of the present invention, wherein a pattern layer is positioned on an opposite side of a backing sheet with respect to a release resin layer.
Figure 2:
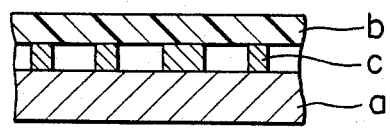
FIG. 2 is a cross-sectional view of a release sheet according to the second embodiment of the present invention, wherein a pattern layer is positioned between a backing layer and a release resin layer.
Figure 3:
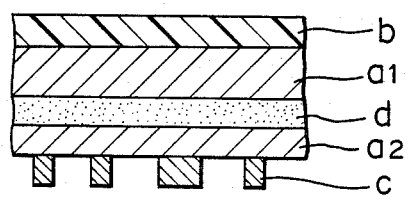
FIG. 3 is a cross-sectional view of a release sheet according to the third embodiment of the present invention.
Figure 4:
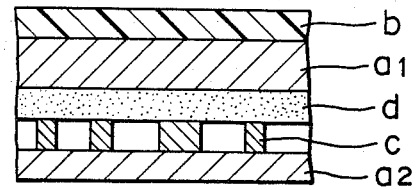
FIG. 4 is a cross-sectional view of a release sheet according to the fourth embodiment of the present invention.

FIGS. 1 to 4 illustrate cross-sectional views of release sheets according to the present invention. In each drawing, references (a), (b), (c) and (d) designate a backing sheet, a release resin layer, a pattern layer and an adhesive layer, respectively. The embodiments as shown in FIGS. 3 and 4 are preferred when, for example, thick paper having poor printebility is used as a backing sheet. Material for layers (a1) and (a2) may be the same or different.

Examples of material for backing sheet (a) include paper such as kraft paper, coat paper, machine glazed paper and wood free paper, and nonwoven fabric. For example, paper having basis weight of 50 to 200 g/m$^2$ may be used as backing sheet (a) and paper having basis weight of 20 to 50 g/m$^2$, for instance, tissue paper, may be used as backing sheet (a2) in FIG. 3.

Examples of material for release resin layer (b) include polyolefin such as polyethylene and polypropylene, silicone resin, alkyd resin, polymethylpentene resin and the like. The thickness of release resin layer (b) is in the range of 3 to 100μ, preferably 5 to 50μ. Although the surface or peeling surface of release resin layer (b) may be smooth or embossed, a release sheet to be used in making synthetic leather has on the peeling surface preferably an embossed pattern, which is complementary to wrinkles, pores and the like inherent in natural leather.

Ink or paint composition is used as material for pattern layer (c). For example, ink or paint composition may be used wherein a mixture of known additives such as vehicle, colorant such as paint or pigment, plasticizer, stabilizer, wax, grease, drying agent, co-drying agent, hardening agent, thickening agent, dispersant, filler and the like is blended with a solvent or a diluent. Examples of vehicle include fats and oils such as linseed oil, soybean oil, synthetic drying oil and the like, natural and treated resins such as rosin, hardened rosin, rosin ester, polymerized rosin and the like, synthetic resins such as rosin modified phenol resin, 100% phenol resin, maleic resin, alkyd resin, petroleum resin, chlorinated polyolefin such as chlorinated polypropylene, vinyl resin, acrylic resin, polyamide resin, epoxy resin, aminoalkyd resin, polyurethane resin and the like, cellulose derivatives such as cellulose nitrate, ethyl cellulose and the like, rubber derivatives such as chlorinated rubber, cyclized rubber and the like, glue, casein, dextrin, zein and the like. A blowing agent may be added to the ink or paint composition. In this case, after the pattern layer is formed by, for example, printing, the blowing agent can be expanded to form a thicker pattern layer which can not be obtained by printing. Examples of such a blowing agent include an inorganic blowing agent such as sodium bicarbonate, ammonium carbonate, sodium borohydride, siliconoxyhydride and the like, an organic blowing agent such as azodicarbonamide, azobisisobutyronitrile, dinitrosopentamethylenetetramine, p-toluenesulfonyl hydrazide, 4,4'-oxybisbenzenesulfonyl hydrazide and the like, microballoon (or microsphere) comprising synthetic resin micro-capsule in which a gas or an organic solvent having a low boiling point is contained.

Now, a method for making a release sheet of the present invention will be explained.

A release sheet as shown in FIG. 1 may readily be made by forming a base sheet consisting of a backing sheet (a) and a release resin layer (b) and, then, forming a pattern layer (c) on the backing sheet (a) of the base sheet. The base sheet may be made by a coating method in which a coating liquid containing the release resin material is coated on the backing sheet (a) by roll coating, gravure coating or the like, or by an extrusion coating of the release resin. Alternatively, the release resin film may be laminated on the backing sheet (a) by an adhesive or by heat fusion.

On the backing sheet (a) of the base sheet thus obtained, a pattern layer is formed to give the release sheet of FIG. 1. The pattern layer can be formed by various conventional methods such as (1) offset, gravure, letterpress, screen, transfer, or electrostatic printing, (2) roll, gravure, knife, or spray coating or, (3) drawing or painting. The pattern layer may be transparent, semiopaque or opaque and it also may or may not be colored. The thickness of the pattern layer is $5\mu$ to 1 mm, preferably $5\mu$ to $100\mu$ and may be gradated.

The release sheet of FIG. 2 may be made by forming the pattern layer (c) on the backing sheet (a) by any of the methods described above and, then, forming the release resin layer (b) on the pattern layer (c) by the coating or the laminating method. In this case, it will be understood that the release resin layer (b) is formed on the opposite side of the backing sheet (a) in relation to the pattern layer (c) to give the release sheet as shown in FIG. 1.

The release sheet of FIG. 3 or 4 can be made as follows. First, the base sheet consisting of the backing sheet (a1) and the release resin layer (b) is made by the above method. Separately, according to the above-mentioned method, the pattern layer (c) is formed on the backing sheet (a2) which is made of a material the same as or different to that of the backing sheet (a1). The resulting sheet consisting of the backing sheet (a2) and the pattern layer (c) is laminated on the backing sheet (a1) of the base sheet through the adhesive layer (d) to give the release sheet of FIG. 3 or 4. Solvent-based or emulsion adhesive can be used for the adhesive layer (d). More specifically, emulsion adhesive using ethylene-vinylacetate copolymer, acrylic resin or the like as vehicle, or solvent-based adhesive using polyurethane, epoxy resin or the like as vehicle can be used.

On the release resin layer (b) of the release sheet thus obtained, a pattern complementary to wrinkles or pores found on the surface of natural leather is provided. Accordingly, the release sheet thus obtained is very useful for the production of synthetic leather. The complementary pattern may readily be embossed before or after the formation of the release sheet.

A method for making synthetic leather using the release sheet of the present invention will now be described.

A coating liquid containing synthetic leather material such as polyurethane and colorant such as pigment or dye is coated on the peeling surface of the release resin layer (b) of the release sheet by a knife coater and, then, it is dried to form a colored film on which backing cloth is then laminated, using an adhesive. The release sheet is then peeled off to leave the synthetic leather. In the part corresponding to the printed areas of the pattern layer, the thickness of the synthetic leather material containing colorant will become thinner to form light-colored areas on the synthetic leather, whereas in the part corresponding to non-printed areas of the pattern layer, the thickness of the synthetic leather material containing colorant will become thicker to form dark-colored areas on the synthetic leather. As a result, a light and dark colored pattern corresponding to the thickness of the pattern layer is obtained. With this method, there is no elimination of the pattern of wrinkles and pores.

More than one synthetic leather material coating liquid containing different kinds or different amounts of colorant may be applied and dried one at a time to form synthetic leather. In the case where more than one coating liquid containing colorant in a different concentration is applied, it is preferred to apply first the liquids having a higher concentration followed by the liquids having a lower concentration.

The advantages of the release sheet of the present invention are listed as follows:

(1) A printing technique can be used so that any pattern can be formed. Since the thickness of the pattern layer can be gradated in the range of 5 to $50\mu$, a new pattern may easily be developed.

(2) The use of a printing technique improves the reproducibility of the draft pattern. By the use of a printing technique, a uniform and standardized release sheet can be mass-produced at a lower cost.

(3) As explained before, a resin composition containing colorant is coated on the release resin layer of the release sheet to provide a film, the thickness and consequently the reflection density of which changes according to the thickness of the pattern layer. Accordingly, the release sheet of the present invention may advantageously be used in making synthetic leather and it can provide a cloudy pattern on the synthetic leather.

The present invention will now be explained in detail with reference to the following Examples to which the present invention are not limited.

EXAMPLE 1

A backing sheet (kraft paper of 130 g/m²) was printed with an ink composition consisting of 55 parts by weight of chlorinated polypropylene resin, 20 parts by weight of loading pigment and 25 parts by weight of xylene using a $150\mu$-deep gravure roll to form a pattern layer of about 40 to $45\mu$ in dry thickness. On the pattern layer, $30\mu$ thick polypropylene film was laminated by extrusion laminating process.

The polypropylene resin surface was then embossed to form thereon an embossed pattern complementary to wrinkles or pores inherent in natural leather.

The release sheet thus formed was about 160μ thick in the non-printed parts and about 210μ thick (maximum) in the printed parts.

On the polypropylene resin surface of the release sheet, a pigmented polyurethane solution (A) (pigment content 2.0 wt.%, solid content 25 wt.%) was coated in the amount of about 100 g/m² using a knife coater with a slit width of 0.12 mm and dried to form the first pigmented film of about 20μ in thickness.

On the first film, another pigmented polyurethane solution (B) (using the same pigment as in the solution (A), content 0.5 wt.%, solid content 30 wt.%) was coated in the amount of about 100 g/m² using a knife coater with a slit width of 0.12 mm and dried to form the second film.

On the second film, a two component polyurethane adhesive (solid content 35 wt.%) was coated in the amount of about 200 g/m² using a knife coater, immediately following which a backing cloth (one side raised, plain cotton cloth) was laminated thereon. After drying, the laminated sheet was aged for 48 hours at 45° C. in a constant temperature bath to cure the two component polyurethane adhesive. After being cooled to room temperature, the release sheet was peeled off leaving the synthetic leather.

The reflection density of the surface of the synthetic leather thus formed was measured by a Macbeth Reflection Densitometer (RD 914 Type made by Macbeth, U.S.A.). The results are given in the following table.

|  | Black | Blue | Red | Yellow |
|---|---|---|---|---|
| Surface corresponding to the non-printed parts | 1.24 | 0.76 | 1.62 | 1.90 |
| Surface corresponding to the printed parts | 1.05 | 0.67 | 1.30 | 1.76 |

Thus, the thickness of the synthetic leather, and consequently the color reflection density of the synthetic leather surface, changes at the printed parts.

Thus, synthetic leather having the irregularly dyed pattern inherent in natural leather can be obtained by the use of a release sheet on which a pattern corresponding to the irregularly dyed pattern is formed.

EXAMPLE 2

One side of kraft paper of 130 g/m² was covered with a 30μ thick polypropylene resin film which was embossed. The other side of the kraft paper was printed with an ink composition having a blowing agent (using New Dipole W-211 ethylene-vinylacetate copolymer as vehicle and with, solid content of 62 wt.%, made by DAINICHI-SEIKA KOGYO, Japan) using a 100μ-deep gravure roll to form a pattern layer of 10μ dry thickness. The thickness of the release sheet was 160μ in the non-printed parts and 170μ maximum in the printed parts.

A pigmented polyurethane resin composition (solid content 30 wt.%) was coated twice on the release resin surface of the release sheet using a knife coater with a slit width of 250μ and the procedure of Example 1 was repeated to form synthetic leather having a pattern similar to the irregularly dyed pattern of a natural leather surface.

EXAMPLE 3

A backing sheet (kraft paper of 130 g/m²) was printed with an ink composition consisting of 65 parts by weight of polyurethane resin, 15 parts by weight of loading pigment and 20 parts by weight of water using a 150μ-deep gravure roll to form a pattern layer of a thickness of 40 to 50μ which was then covered with a polypropylene resin film of 30μ in thickness which was then embossed. A release sheet having a pattern layer positioned between a backing sheet and a release resin layer (see FIG. 2) was obtained. The thickness of the release sheet was about 160μ in the non-prited parts and less than about 250μ in the printed parts.

The release sheet was used to make synthetic leather in a manner similar to that ot Example 1.

EXAMPLE 4

One side of a backing sheet (kraft paper of 130 g/m²) was covered with a 30μ-thick polypropylene film which was then embossed. The other side of the backing sheet was gravure-printed with the ink composition of Example 2 using a 100μ-deep gravure roll to form a pattern layer of a dry thickness of 30μ. The thickness of the release sheet thus formed was 160μ in the non-printed parts and the maximum thickness of the sheet was 190μ in the printed parts.

The release sheet was used to make synthetic leather in a manner similar to that of Example 1.

EXAMPLE 5

One side of a backing sheet (kraft paper of 130 g/m²) was covered with a 30μ-thick polypropylene film which was then umbossed. the other side of the backing sheet was gravure-printed with the ink composition of Example 2 using a gravure roll having depths of 100μ, 60μ and 40μ to form a pattern layer of a dry thickness of 30μ, 18μ and 7μ.

The release sheet thus formed was used to make synthetic leather having a pattern of four grades of color reflection density.

EXAMPLE 6

Tissue paper of 22 g/m² was printed in a manner similar to that of Example 5 to form a pattern layer thereon. One side of a backing sheet (kraft paper of 130 g/m²) was covered with a 30μ-thick polypropylene film which was then embossed. The tissue paper on which the pattern layer was formed was laminated on the other side of the backing sheet, using an adhesive.

The release sheet thus formed was used to make synthetic leather in a manner similar to that of Example 1.

EXAMPLE 7

Tissue paper of 22 g/m² was printed in a manner similar to that of Example 1 to form a pattern layer. One side of a backing sheet (kraft paper of 130 g/m²) was covered with a 30μ-thick polypropylene resin film which was then embossed. The other side of the backing sheet was bonded to the non-printed side of the tissue paper, using a polyurethane resin type adhesive, to obtain a release sheet.

The release sheet thus made was used in a manner similar to that of Example 1 to make synthetic leather having a cloudy pattern.

EXAMPLE 8

A pattern layer was formed on a machine glazed surface of bleached machine-glazed kraft paper in a manner similar to that of Example 1. One side of a backing sheet (kraft paper of 130 g/m²) was coated with a 30μ-thick polypropylene resin film which was then embossed. The other side of the backing sheet was bonded to the printed side of the kraft paper using an emulsion type adhesion of ethylene-vinylacetate copolymer to make a release sheet.

The release sheet thus made was used in a manner similar to that of Example 1 to make synthetic leather having a light and dark colored cloudy pattern.

What we claim is:

1. A release sheet for use in making synthetic leather, which comprises a release resin layer having a first surface on which an embossed pattern complementary to wrinkles, pores and the like inherent in natural leather is formed and a second surface to which a backing sheet and a pattern layer are adhered.

2. The release sheet of claim 1 wherein the pattern of the pattern layer is one which corresponds to an irregularly dyed, light and dark colored pattern formed on the surface of natural leather when the natural leather is dyed.

3. The release sheet of claim 1 wherein the release resin layer, the backing sheet and the pattern layer are integrally laminated in this order.

4. The release sheet of claim 1 wherein the release resin layer, the pattern layer and the backing sheet are integrally laminated in this order.

5. The release sheet of claim 1 wherein the backing sheet is paper.

6. The release sheet of claim 1 wherein the release resin layer is made of material selected from the group consisting of polyolefin, silicone resin, alkyd resin and polymethylpentene resin.

7. The release sheet of claim 1 wherein the thickness of the pattern layer is in the range of 5 microns to 1 mm.

8. The release sheet of claim 1 wherein the thickness of the pattern layer is in the range of 5 microns to 100 microns.

9. The release sheet of claim 1 wherein the release resin layer, a first backing sheet, an adhesive layer, a second backing sheet and the pattern layer are integrally laminated in this order.

10. The release sheet of claim 1 wherein the release resin layer, a first backing sheet, an adhesive layer, the pattern layer and a second backing sheet are integrally laminated in this order.

11. A method for making a release sheet for use in making synthetic leather, which comprises:

forming a pattern layer on one side of a backing sheet by printing an ink or paint composition;

forming a release resin layer on the pattern layer by applying a coating liquid of the resin material or by laminating a film of the resin material; and then embossing the release resin layer to form thereon an embossed pattern complementary to wrinkles, pores and the like inherent in natural leather.

12. A method for making a release sheet for use in making synthetic leather, which comprises:

forming a release resin layer on one side of a backing sheet by applying a coating liquid of the resin material or by laminating a film of the resin material;

embossing the release resin layer to form thereon an embossed pattern complementary to wrinkles, pores and the like inherent in natural leather; and then forming a pattern layer on the other side of the backing sheet by printing an ink or paint composition.

13. A method for making synthetic leather which comprises the sequential steps of coating a liquid containing synthetic leather material and colorant by a knife coater on the first surface of the release resin layer of the release sheet of claim 1, drying it to form a colored film on the release resin layer, laminating a backing cloth on the colored film, using an adhesive and then peeling off the release sheet to leave the synthetic leather having on the leather material surface a light and dark colored pattern corresponding to the thickness of the pattern layer and having on the leather material surface the pattern corresponding to the embossed pattern complementary to wrinkles, pores and the like inherent in natural leather.

14. The method of claim 13 wherein the synthetic leather material is polyurethane.

15. The method of claim 13 wherein more than one synthetic leather material coating liquids containing different kinds of colorants are applied and dried one at a time.

16. The method of claim 13 wherein more than one synthetic leather material coating liquids containing different amounts of colorant are applied and dried one at a time.

17. The method of claim 16 wherein the liquids are applied consecutively in the order of decreasing colorant concentration.

* * * * *